United States Patent
Schnallinger

(10) Patent No.: US 6,969,481 B2
(45) Date of Patent: Nov. 29, 2005

(54) METHOD FOR PRODUCING A PIPE TERMINATION BOX FROM THERMOPLASTIC MATERIAL

(76) Inventor: Helmuth Schnallinger, Sarmingstein 46, Sarmingstein (AT) A 4382

( * ) Notice: Subject to any disclaimer, the term of this patent is extended or adjusted under 35 U.S.C. 154(b) by 95 days.

(21) Appl. No.: 10/415,858

(22) PCT Filed: Aug. 1, 2002

(86) PCT No.: PCT/AT02/00230

§ 371 (c)(1),
(2), (4) Date: May 2, 2003

(87) PCT Pub. No.: WO03/011571

PCT Pub. Date: Feb. 13, 2003

(65) Prior Publication Data

US 2004/0026830 A1    Feb. 12, 2004

(30) Foreign Application Priority Data

Aug. 2, 2001 (AT) .............................. A 1202/2001

(51) Int. Cl.[7] ........................ B29C 51/00; B29C 61/02; B29C 61/04
(52) U.S. Cl. ...................... 264/266; 264/267; 264/268; 264/342 R; 264/345; 264/348
(58) Field of Search .................. 264/230, 259, 264/266, 267, 268, 319, 320, 322, 342 R, 264/345, 348

(56) References Cited

U.S. PATENT DOCUMENTS

| | | | |
|---|---|---|---|
| 4,351,791 A | * | 9/1982 | de Putter .................... 264/267 |
| 4,457,886 A | | 7/1984 | Acda et al. |
| 4,468,367 A | * | 8/1984 | Beune et al. ................ 264/255 |
| 4,705,058 A | * | 11/1987 | Marklew .................. 137/15.24 |
| 4,743,422 A | * | 5/1988 | Kalriis-Nielsen et al. ... 264/255 |
| 5,057,263 A | * | 10/1991 | Bengtsson .................. 264/249 |
| 5,064,207 A | * | 11/1991 | Bengtsson .................. 277/616 |
| 5,643,521 A | * | 7/1997 | Nehm ........................ 264/255 |
| 6,277,315 B1 | * | 8/2001 | H.ang.llstedt et al. ...... 264/250 |

FOREIGN PATENT DOCUMENTS

| | | |
|---|---|---|
| EP | 0 124 678 | 11/1984 |
| EP | 0 243 331 | 10/1987 |
| EP | 0 685 317 | 12/1995 |

* cited by examiner

Primary Examiner—Angela Ortiz
(74) Attorney, Agent, or Firm—Collard & Roe, P.C.

(57) ABSTRACT

A method is described for producing a pipe end socket (3) made of thermoplastic material with a sealing ring (5) which engages in a form-fitting manner on the inside of the socket in a circumferential bead (4) and which comprises a sealing part (6) and a supporting part (7), with the sealing ring (5) being introduced into a preformed bead region and is then tightly held in a form-fitting manner in the circumferential bead (4) by a final forming of the preformed bead region. In order to provide advantageous process conditions it is proposed that the pipe end socket (3) with the circumferential bead (4) is preformed at a deformation temperature corresponding at least to the softening temperature with an overdimension which allows an insertion of the sealing ring (5), and after the cooling below the softening temperature and after inserting the sealing ring (5) said pipe end socket with the circumferential bead is pressed into the final shape by taking into account a cooling-induced shrinkage.

2 Claims, 2 Drawing Sheets

METHOD FOR PRODUCING A PIPE TERMINATION BOX FROM THERMOPLASTIC MATERIAL

CROSS REFERENCE TO RELATED APPLICATIONS

Applicant claims priority under 35 U.S.C. §119 of Austrian Application No. A 1202/2001 filed Aug. 2, 2001. Applicant also claims priority under 35 U.S.C. 365 of PCT/AT02/00230 filed Aug. 1, 2002. The international application under PCT article 21(2) was not published in English.

FIELD OF THE INVENTION

The invention relates to a method for producing a pipe end socket made of thermoplastic material with a sealing ring which engages in a form-fitting manner on the inside of the socket in a circumferential bead and which comprises a sealing part and a supporting part, with the sealing ring being introduced into a preformed bead region and is tightly held in a form-fitting manner in the circumferential bead by a final forming of the preformed bead region.

DESCRIPTION OF THE PRIOR ART

In order to obtain a leakproof connection when introducing a pipe end into a pipe socket end of a subsequent pipe, an annular seal is provided on the inside of the pipe socket end which engages in a circumferential bead in a form-fitting fashion. For the purpose of providing a secure hold of the annular seal in the circumferential bead, the sealing ring consists of a supporting part in addition to the actual sealing part, which supporting part allows a deformation of the sealing ring which thus prevents any escape of the sealing ring from the circumferential bead. The supporting part can be arranged as a supporting ring which engages between two legs of the sealing part which has a U-shaped cross section (EP 0 124 678 A1) or be molded in the axial direction on the sealing part (EP 0 243 331 A2). In order to ensure that the sealing ring can be received in a form-fitting fashion in a circumferential bead of the pipe end socket despite its low deformability, the sealing ring is drawn up on a mandrel and pressed with the mandrel into the pipe end socket consisting of thermoplastic material which for this purpose is heated beyond the softening point. If the sealing ring is introduced with the supporting part first into the pipe socket end, the supporting part, which for this purpose is provided with a conical arrangement, can be used as a shaping tool for widening the softened pipe end section. Since the widened socket section contracts again during cooling, a circumferential bead forms about the sealing ring which holds it in a form-fitting manner, so that the mandrel merely needs to be pulled out of the pipe end socket after the cooling-induced hardening of the pipe end socket, namely by stripping off the sealing ring from the mandrel which is tightly held in the circumferential bead. The production tolerances are considerable in this process, which has led to the consequence (EP 0 685 317 A1) to partly preform the circumferential bead pressurizing the pipe with the pipe socket end from the inside with pressurized gas and pressing the same into a hollow mold. Since the socket end needs to be widened at the insertion side of the sealing ring to its largest diameter before the sealing ring mounted on the mandrel can be introduced into the socket with the mandrel, the widened socket section needs to be shrunk to the mandrel diameter again by heat treatment in order to grasp over the sealing ring by the circumferential bead in a form-fitting manner on the side facing the open socket end. In this way it is not possible to decisively improve the production tolerances which is of particular importance especially in the sealing area.

SUMMARY OF THE INVENTION

The invention is thus based on the object of providing a method for producing a pipe socket end made of thermoplastic material of the kind mentioned above in such a way that low production tolerances can be ensured especially in the region of the sealing ring with a relatively low amount of efforts.

The invention achieves this object in such a way that the pipe end socket with the circumferential bead is preformed at a deformation temperature corresponding at least to the softening temperature with an overdimension which allows an insertion of the sealing ring, and after the cooling below the softening temperature and after inserting the sealing ring, said pipe end socket with the circumferential bead is pressed into the final shape by taking into account a cooling-induced shrinkage.

By preforming the pipe end section and the circumferential bead with an overdimension which allows an insertion of the sealing ring, the end section of the socket between the circumferential bead and the face-side edge of the socket need not be widened according to the largest diameter of the sealing ring when the sealing ring is not mounted on a mandrel, but instead is introduced into the socket by a slight deformation in an inclined position relative to the socket axis until it engages in the preformed circumferential bead. After the introduction of the sealing ring into the socket, the pipe end section with the circumferential bead is compressed to the end shape. The known fact can be exploited advantageously (EP 0 666 790 B1) that as a result of a compression of a socket which is widened after the heating to a softening temperature, a subsequent shrinkage is prevented after its cooling below the softening temperature and thus a low production tolerance can be ensured. If one considers the cooling-induced shrinkage behavior in compressing the pipe end section to its end shape, it is possible to ensure high dimensional accuracy for the pipe end sections with inserted sealing rings even under the conditions of series production.

As a result of the mandrel-free introduction of the sealing rings into the pipe end sections preformed with overdimension, it is no longer necessary concerning the configuration of the sealing rings to take into account the manner of the shaping of the circumferential beads. The sealing ring which is shaped in the known manner of axially adjacent sealing and supporting parts can be inserted with the sealing part first into the circumferential bead, so that the harder supporting part faces the open socket end and can be provided with an inwardly projecting stripping means which will shear off any dirt particles adhering to the pipe end when a pipe to be connected is pushed into the pipe end section, thus ensuring that when the sealing part of the sealing ring rests against the pipe it cannot be impaired by attached dirt particles.

It is also possible to insert sealing rings made of two parts in which the supporting part engages between two legs of the sealing part which is U-shaped in its cross section, because in this case the two legs of the sealing parts are compressed axially against the supporting part when the pipe section is compressed in order to receive the sealing ring in the circumferential bead under a pretension.

BRIEF DESCRIPTION OF THE DRAWINGS

The method in accordance with the invention is explained in closer detail by reference to the enclosed drawings, wherein.

DESCRIPTION OF THE PREFERRED EMBODIMENTS

Figure 1:
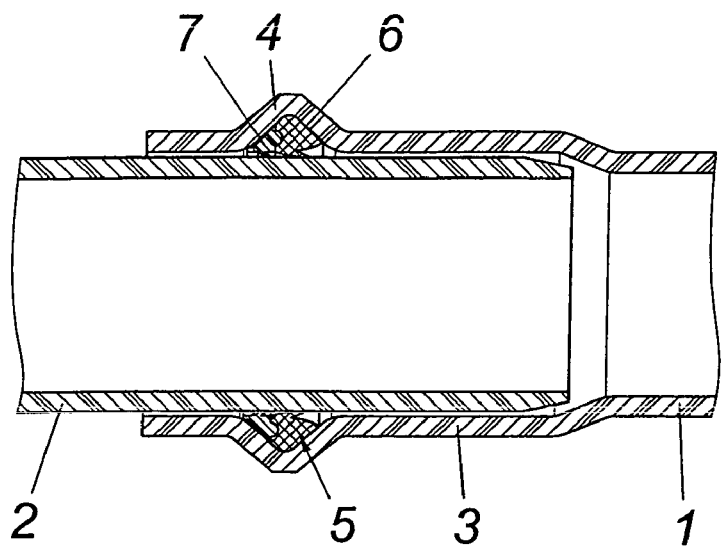
FIG. 1 shows a pipe end section as arranged in accordance with the invention with a connecting pipe introduced into the socket in a schematic axial sectional view.

As is shown in FIG. 1, one of the two pipes 1 and 2 which are to be joined in a leakproof fashion comprises a pipe end section 3 with a circumferential bead 4 into which a sealing ring 5 is inserted in a form-fitting fashion. Said sealing ring 5 is composed of a rubber-elastic sealing part 6 and a supporting part 7 which is sufficiently dimensionally stable in order to prevent any escape of the sealing ring 5 from the circumferential bead 4. When the free end of pipe 2 is introduced into the pipe end section 3 of pipe 1, the sealing ring 5 rests in a sealing fashion on the outside jacket of pipe 2 under a respective pretension of the sealing part 6, so that no further measures are required for sealing the pipe socket connection.

Figure 2:
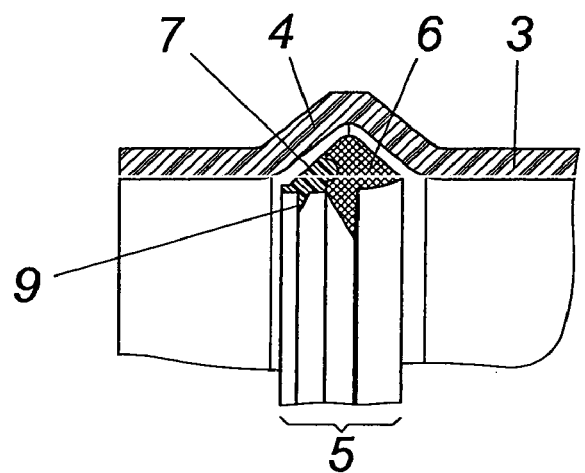
FIG. 2 shows the pipe end section which is preformed with an overdimension in the region of the circumferential bead with an inserted sealing ring in an axial sectional view on an enlarged scale.
Figure 3:
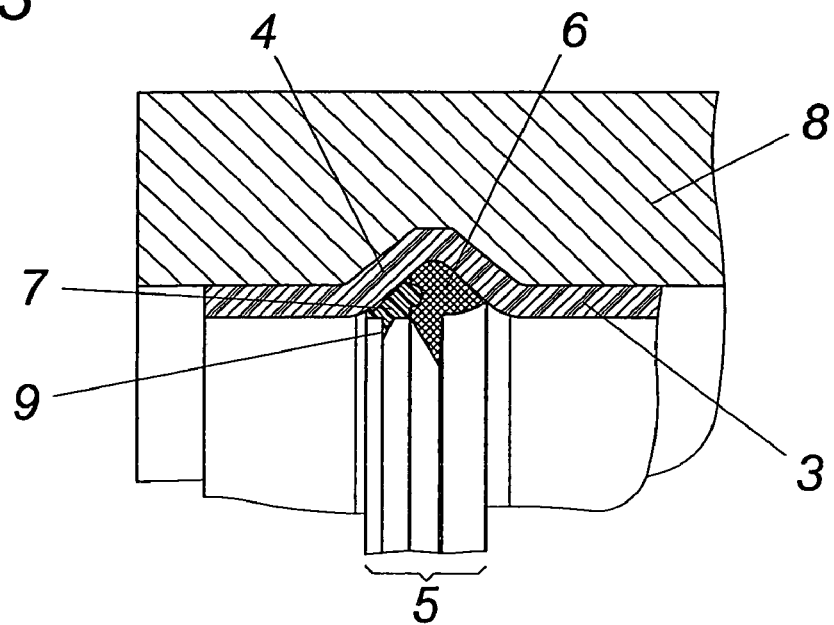
FIG. 3 shows the preformed pipe end section according to FIG. 2 after the compression to the final shape.

The sealing effect is dependent on the production tolerances, however. In order to combine high dimensional accuracy with a simple production, the sealing ring 5 is not introduced into the pipe end section 3 with the help of a mandrel which for this purpose would have to be widened in a respective manner. Instead, it is inserted under a slight deformation into the pipe end section produced with an overdimension, with the sealing ring 5 assuming an insertion position which is inclined to the socket axis. In the region of the circumferential bead 4, which is also preformed with a respective overdimension, the sealing ring 5, which is slightly deformed for the insertion, relaxes and assumes its original round shape. The deformation of the sealing ring 5 which is necessary for its insertion is simple for the reason that the stretching which is necessary with the compression in the one direction in the direction perpendicular to the latter is not obstructed by the pipe end section 3 or the circumferential bead 4. The pipe end section 3 which is preformed with the circumferential bead 4 in the conventional manner at a respective deformation temperature is then compressed by means of pressing tools 8 distributed over the circumference from the prefabricated overdimension according to FIG. 2 to the final shape according to FIG. 3, with the sealing ring 5 being enclosed by the circumferential bead 4 in a form-fitting manner. Since this compression of the pipe end section 3 to the predetermined final shape is performed after a cooling of the pipe end section 3 heated for preforming over the softening point, the final shape is permanently ensured without any age-induced shrinkage, so that by taking into account any cooling-induced shrinkage very narrow production tolerances can be ensured.

Due to the preforming of the pipe end section 3 and the circumferential bead 4 with overdimension, the sealing ring 5 merely needs to be adjusted to the cross-sectional shape of the circumferential bead 4. Concerning its structure it can be provided with a design which is independent of the production of the circumferential bead, however, because it is merely relevant to allow a deformation which is sufficient for the given overdimension by laterally compressing on mutually diametrically opposite sides in order to introduce the thus ovally deformed sealing ring 5 in an inclined position relative to the socket axis into the circumferential bead 4. It is thus certainly possible according to FIGS. 2 and 3 to provide the supporting part 7 which is axially attached to the sealing part 6 on the ring side facing the socket opening and to provide the same with an inwardly projecting, lip-like stripping means 9 which during the insertion of a connecting pipe 2 into the pipe end socket 3 shears off any dirt accumulations which may be present on the outside jacket of the connecting pipe 2, so that the sealing part 6 can sit close to the outside jacket of the pipe 2 in a sealing fashion without being impaired by such dirt particles.

Figure 4:
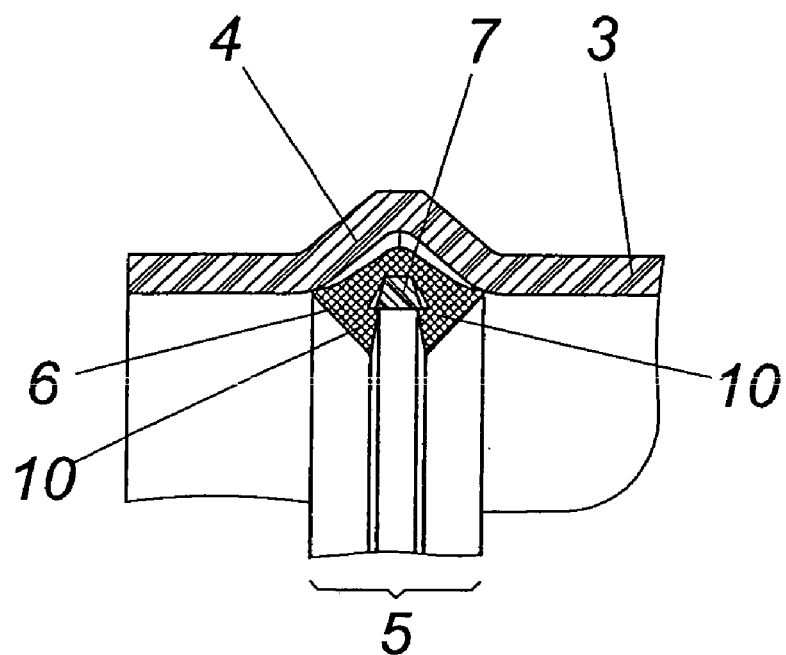
FIG. 4 shows a representation according to FIG. 2 of a preformed pipe end section when using a two-part sealing ring.
Figure 5:
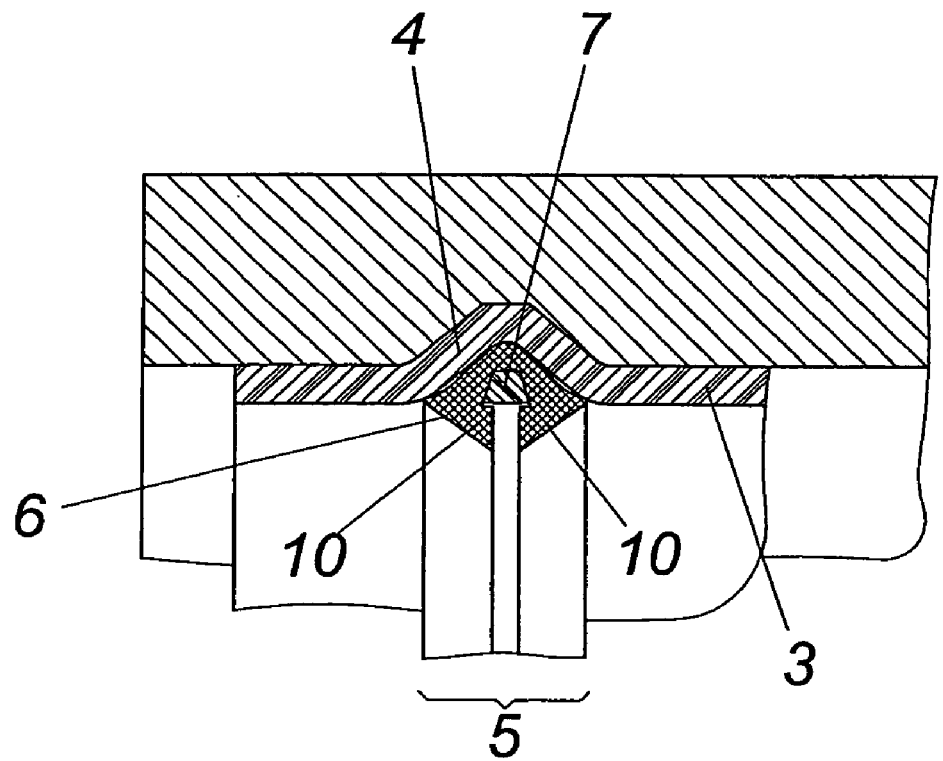
FIG. 5 shows the pipe end section according to FIG. 4 after the compression to the final shape.

FIGS. 4 and 5 show a two-part sealing ring 5 which consists of a sealing part 6 which is U-shaped in its cross section and comprises two legs 10 which receive between themselves the supporting part 7 in the form of a supporting ring. As a result of the arrangement of the legs 10 of the sealing part 6, axial pressure forces can be exerted on the sealing part 6 when pressing the pipe end section 3 to the final shape by a respective pressing tool 8 via the walls of the circumferential bead 4, which pressure forces ensure the holding of the supporting part 7 between the legs 10 under a pretension, as is shown in FIG. 5 in comparison with FIG. 4.

What is claimed is:

1. A method for producing a pipe end socket made of thermoplastic material, the pipe end socket having a circumferential bead and a sealing ring form-fittingly engaging an inside of the bead, the sealing ring comprising a sealing part and a support part, which comprises the steps of preforming the pipe end socket at a deformation temperature corresponding at least to a softening temperature of the thermoplastic material, with an inner diameter of the circumferential bead exceeding a desired final inner diameter while the rest of the pipe end socket is widened to a dimension smaller than an outer diameter of the sealing ring; introducing the sealing ring into the preformed circumferential bead after the pipe end socket has been cooled to below the softening temperature; elastically compressing the sealing ring to a dimension in which the smallest diameter of the sealing ring corresponds to the widened dimension of the rest of the pipe socket, the sealing ring being introduced in an inclined position relative to the socket axis until it assumes a straight position and is reformed upon engaging the circumferential bead; further cooling the pipe end socket after the sealing ring has been introduced to a temperature below the softening temperature, the cooling temperature causing a predetermined shrinkage; and pressing the pipe end socket into a final shape determined by the shrinkage.

2. The method of claim 1, wherein the sealing part of the sealing ring is U-shaped in cross section and comprises two legs receiving the supporting part therebetween, and the sealing part is axially compressed when the pipe end socket is pressed into the final shape.

* * * * *